United States Patent Office 3,422,328
Patented Jan. 14, 1969

3,422,328
VALVE OPERATOR CONTROL HAVING ELECTRICAL SWITCHING CIRCUITRY
Clifford E. Anderson, Houston, Tex., and David W. Brown, Wayland, Mass., assignors to ACF Industries, Incorporated, New York, N.Y., a corporation of New Jersey
Filed Sept. 29, 1965, Ser. No. 491,279
U.S. Cl. 318—103                        7 Claims
Int. Cl. H02p 1/54

ABSTRACT OF THE DISCLOSURE

A valve operator control mechanism for one or more submerged electrically energized valve operators each having an electric motor for energization thereof. Each motor circuit is physically connected but normally electrically disconnected from a common power circuit and is responsive to a signal applied to solid state control circuitry for each motor to become electrically connected to the power circuit for operation of a selected one or more of the valve operators.

---

This application is directed generally to power operator devices for controlling mechanical devices such as valves and the like, and more particularly, to the control of remotely located electrically energized power operator devices.

Electrically driven and hydraulically driven power operators for controlling mechanical devices such as valves, blowout preventers, and the like have both enjoyed extensive use for controlling the flow of fluid in pipelines or fluid processing systems. Electric and hydraulic power operator systems for land based fluid flow control facilities have both been provided with remote control apparatus for controlling the operation thereof from remotely located control facilities. Considerable difficulty arises concerning remote control, however, when the mechanical device to be controlled by a power operator is located below the surface of a body of water such as the ocean. For example, there have been considerable technology advances in recent years concerning the drilling and completion of offshore petroleum wells. While some petroleum wells are completed above the surface of the ocean by locating a wellhead assembly for controlling the well on a platform or the like, in view of well completion technology advances, it has become practical to locate the wellhead assembly on the ocean floor where it is safe from damage by wave action during storms. Also, when the well is drilled in deep water, it is often imperative that the wellhead assembly be located on the ocean floor. Fluid flowing from wellhead assemblies located on the ocean floor is generally transported by pipelines, also located on the ocean floor, to land based fluid storage facilities or to storage facilities located on floating storage vessels.

For controlling the flow of fluids from such surface wellhead assemblies, generally a number of power operator devices are connected to the wellhead assembly and are adapted, when energized, to control opening or closing of the valves thereof. It has generally heretofore been considered impractical to provide remotely controllable electrically energized power operator devices for submerged valves for a number of reasons. While electrically energized land based power operators are quite practical, the large amount of intricate and delicate mechanical switching apparatus required to provide specific operator functions is a prime consideration contributing to the prohibitiveness of submerged electric power operators. Should the mechanical switching apparatus of a land based electrically energized power operator become inoperative due to mechanical failure, it is a simple matter for a repairman to gain access to the circuitry of the power operator and replace or repair that portion of the mechanical switching equipment which has become inoperative. It is therefore apparent why reliability of the power operator construction is a prime consideration when the power operator is to be submerged in a body of water such as the ocean. A repair operation, therefore, involving replacement of a small part such as a switch or a resistor, etc. which is required to restore the power operator to working condition, while being generally inexpensive in nature, may be extremely difficult or even impossible to accomplish when considering repair or replacement of electrical equipment under water.

Hydraulic equipment has generally been employed in the provision of power operators for controlling underwater valves and the like, specifically because of their reliability. Hydraulically energized power operators, however, have a number of distinct disadvantages which in general have contributed to the development of electrically energized power operators and operator control systems, which are the subject of the present invention. Hydraulically energized power operators generally provide no positive feedback of information so that the specific condition of the power operator can be determined at all times. It is generally highly desirable and frequently imperative that the condition of the wellhead valves be positively identifiable at all times.

A particular disadvantage involved in the use of hydraulically energized undersea control apparatus concerns the amount of hydraulic piping necessary for conducting hydraulic fluid to the remotely located hydraulic operator in sufficient pressure ranges for expedient operation of the hydraulic operator. It has been roughly estimated that a hydraulic fluid line for transporting hydraulic fluid to a remotely located power operator must be at least one inch in diameter for every mile of distance due to the pressure loss from friction between the line and the hydraulic fluid. For example, it is estimated that hydraulic piping for a mechanical device located five miles from the source of hydraulic control would require hydraulic piping at least five inches in diameter. The cost of double line hydraulic control piping for control of such a remotely located undersea device could be exceedingly expensive.

The tendency for the development of undersea electric operators has been brought about in part by the location of wellhead assemblies in extremely deep water, which in the case of hydraulic power operator constructions, would generally require extremely expensive hydraulic control installations.

It is therefore a primary object of this invention to provide an electrically energized power operator construction which is adapted for submersion.

It is a further object of this invention to provide a novel electrically energized submersible power operator construction for controlling mechanical devices and which includes electrical circuitry located within or adjacent to the power operator and which is substantially free of mechanical circuit control apparatus.

It is a further object of this invention to provide a novel electrically energized submersible power operator construction which provides a positive feedback of information to indicate the position of the power operator and the mechanical device in all positions of operation.

It is a further object of this invention to provide a novel electrically energized submersible power operator construction and a control facility therefor which allows simultaneous or selective operation of one or more selected power operator devices from a remotely located control facility.

Another object of this invention contemplates the provision of a novel electrically energized power operator and a control system therefor which is adapted to control one or more remotely located power operator devices by means of a single control cable having common electrical power and control circuits therein.

It is among the several objects of this invention to provide a novel control system including nonmechanical apparatus for each of the motors of a plurality of remotely located mechanical devices and including electronic switching of the electrical circuitry of the motors for individual or collective electrical connection thereof to a single motor power circuit.

Briefly the invention involves an electrical control system including electronic switching circuitry for controlling energization of the electrical motor of a power operator device. The switching circuitry comprises controlled rectifiers and diodes which are provided for each power lead of the circuitry for the electrical power operator motor and are connected in opposite polarity parallel relationship. The controlled rectifiers of the circuitry are electrically energized by externally controlled means which condition the same, thereby allowing the passage of one-half cycle of the alternating current through the circuitry for operation of the electric motor which drives the power operator mechanism. The opposite polarity diodes are provided to admit the other half cycle of alternating current, thereby cooperating with the silicon controlled rectifiers to admit alternating current for operation of the power operator motor. While the switching circuitry is preferably composed of externally controllable silicon controlled rectifiers connected in opposite polarity with solid state diodes, this application must not be construed as being limited thereto. A land or surface based control facility is provided for controlling the operation of the remotely located electrically energized power operators and comprises electrical control circuitry for selectively energizing one or more of the remotely located power operators either individually or simultaneously as desired. The control facility includes visual indicator construction for each of the power operators, which is energized responsive to the condition of the remotely located power operator devices, to give a positive indication of the condition of the power operator devices at any one time. When the power operator is adapted to control a wellhead valve, for example, the visual indicator means is energized to indicate whether the power operator device has positioned the associated valve in an open or closed position or is moving the valve between open and closed positions. The electrical control circuitry for the remotely located power operators also includes circuitry which is responsive to selection of a particular direction of operator rotation for reversing the phase sequence of the electrical energy transmitted to the motor of the power operator thereby driving the motor of the valve operator in a preselected direction.

Other and further objects of the invention will be come obvious upon an understanding of the illustrated embodiment about to be described, or will be indicated in the appended claims and various advantages not referred to herein will become apparent to one skilled in the art upon the employment of the invention in practice.

Preferred embodiments of the invention have been chosen for purpose of illustration and description and are shown in the accompanying drawings forming a part of the specification wherein.

Figure 1:
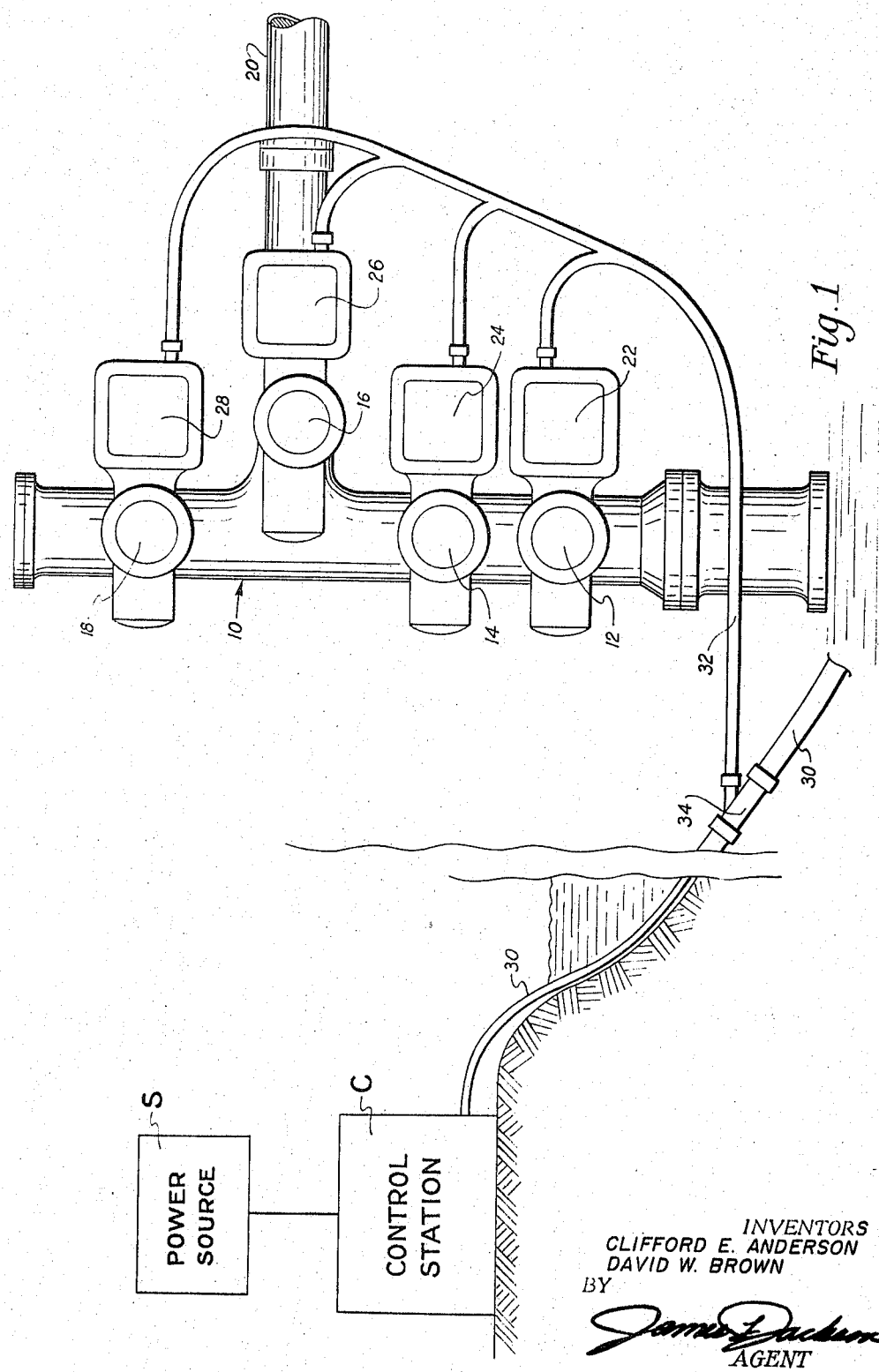
FIGURE 1 is a partial elevational view and fragmentary schematic view illustrating a wellhead assembly located on the ocean floor which is provided with electrically energized power operators and is controlled in accordance with the spirit and scope of the instant invention.

Referring now to the drawings for a better understanding of the invention, in FIGURE 1, there is illustrated a wellhead assembly which is positioned on the ocean floor and which has a bottom master valve 12, a top master valve 14, a wing valve 16 and a swab valve 18 for controlling the flow of fluid from the well to a flow line 20. Each of the wellhead valves is provided with an electrically energized remotely controllable power operator 22, 24, 26 and 28, respectively, for controlling the operation of the wellhead valves.

For remote control of the power operators of the wellhead assembly, a control station C is located above the surface of the ocean either on land or on a floating control facility or offshore platform. The control station C is provided with a source S of electrical energy, and in turn supplies electrical energy to the individual electrically energized power operators of the wellhead assembly for operation thereof. A single main control cable 30 is connected at one end thereof to the control station C and the other extremity thereof extends to the vicinity of the wellhead assembly 10. The primary cable 30 is provided with sufficient power and control circuitry for energization and control of one of the electrically energized power operators 22, 24, 26 and 28, and in addition, includes an electrical command circuit for each of the power operator devices. For example, as illustrated in FIGURE 1, the primary cable 30 would be provided with at least four command circuits, one for each of the power operator devices. If the control system is designed to control the valves of more than a single wellhead assembly, the primary cable 30 must be provided with a single command circuit for each of the valves or other mechanical devices for which power operation may be desired.

A branch cable 32 is interconnected with the primary cable 30 by suitable connection structure 34. The branch cable 32 is provided with the same number of power and operator control circuits as is provided in the primary cable 30 and includes a single command circuit for each of the power operators for which control is desired. The branch cable 32 is formed into a harness at one extremity thereof branching the power circuitry and the command circuits to the respective power operators. Suitable electrical switching circuitry to be described in detail hereinbelow is disposed within the power operator housing 24 and serves to electrically connect the power circuitry of a selected one or more of the power operators to the power circuitry of the single branch cable 32 for operation of the selected power operator or operators to the exclusion of the other operators. Secondary electrical cables 34, 36 and 38 are respectively connected to the power operators 22, 26 and 28 and include circuitry connecting the electrical circuitry of the power operator to the electrical switching circuitry. The particular structural connection between the primary cable, branch cable and secondary or auxiliary cable is considered illustrative rather than limiting in regards to this invention since other connecting arrangements may be employed within the spirit and scope of this invention.

Figure 2:
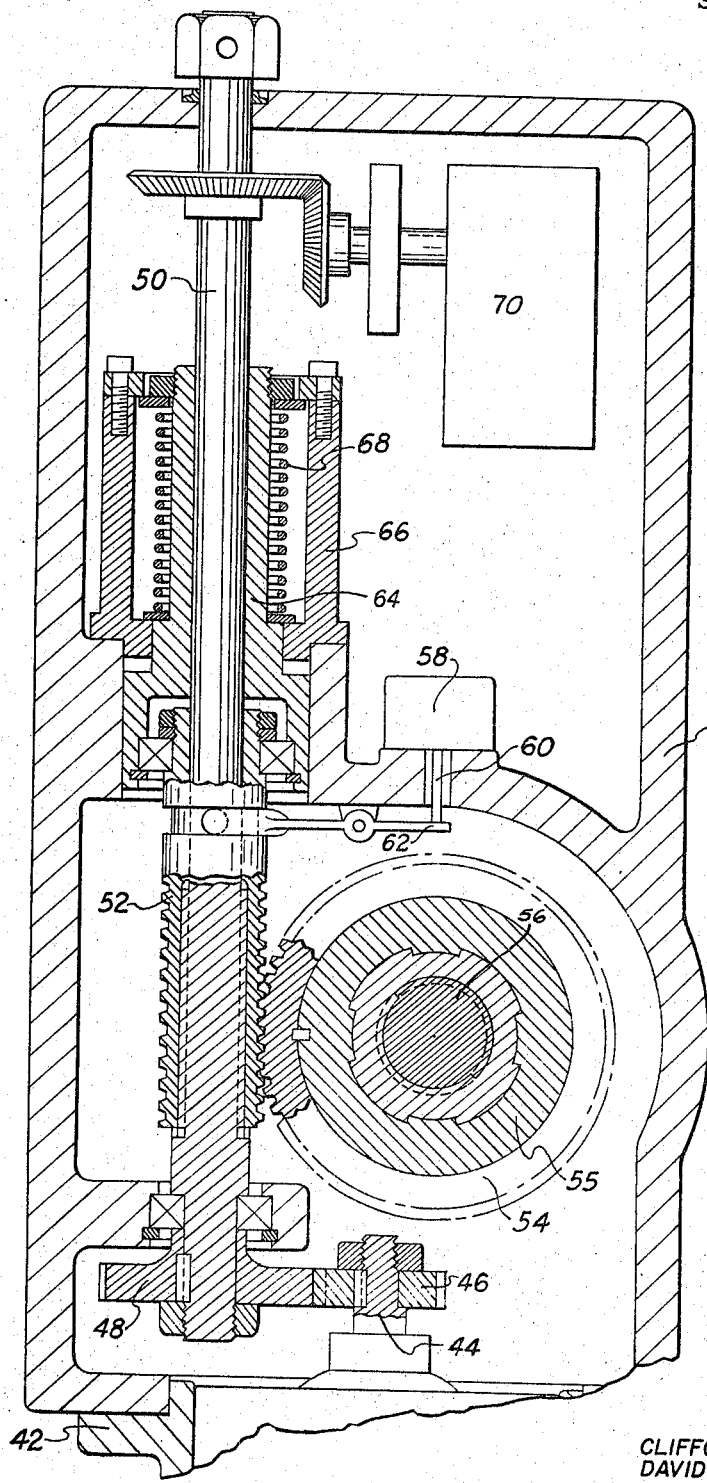
FIGURE 2 is a sectional view of an electrically energized operator illustrating gear drive torque switch control and limit switch control of a power operator.

As illustrated in FIGURE 2, a typical power operator construction is illustrated which includes a power operator housing 40 to which is attached an electrical motor 42. A rotary drive shaft 44 of the motor 42 is provided with a pinion gear 46, which is adapted to drive a gear 48 of an operator drive shaft 50. A worm 52 is non-rotatably fixed to the drive shaft 50 and is adapted upon being rotated to impart rotation to a worm gear 54. The worm gear 54 is interconnected with a valve stem drive construction 55, which in turn is adapted for threaded interengagement with the valve stem 56 of a typical valve. For operation of valves of the type generally empoyed in wellhead assemblies, the valve stem 56, by its threaded interengagement with the drive structure 55, will impart longitudinal translation to the valve stem 56, thereby moving the gate portion of the valve as desired. It is to be understood, however, that the instant invention is not limited to gate valve structures having rising stems for the operation thereof. For example, the valve or mechanical device to be operated may be actuated by rotary movement of the valve stem 56. There would merely be provided a nonrotatable connection between the valve stem and the worm gear and rotation of the worm gear would impart rotation to the valve stem and consequently to the valve. This would adapt the power operator for controlling rotary valves such as spherical and cylindrical plug valves and the like.

To protect the power operator against possible damage, in the event of mechanical failure of the valve or in the event of an obstruction becoming lodged within the valve, a torque switch 58 having a switch actuator stem 60 is fixedly attached to the housing structure. An operator arm 62, which is pivotedly connected to the housing structure, is engageable with a portion of the worm 52 and is actuated by a longitudinal movement of the worm 52 for imparting longitudinal movement to or allowing longitudinal movement of the stem 60 of the torque switch 58 depending upon the direction of motor rotation.

A torque sleeve 64, which is retained within a torque sleeve bracket 66 is rotatably connected through suitable bearing structure to the worm 52. The torque sleeve 64 is movably retained within the torque sleeve bracket 66 and is retained in a preselected position relative to the torque switch bracket by a compression spring 68. Should the valve stem 56 become difficult or impossible to move due to an obstruction within the valve or due to mechanical failure of a portion of the valve, the worm 52 being longitudinally movable relative to the shaft 50 will be driven against the bias of the spring 68, thereby pivoting the arm 62 and causing the control stem 60 to actuate the torque switch 58. During the operation of the electrical motor 42 of the power operator, the torque switch is normally in a closed condition allowing the flow of current therethrough. Upon longitudinal movement of the operator shaft 50 in either direction, the torque switch will open the electrical circuit, thereby deenergizing the motor 42 to prevent damage to the motor 42 by overload.

A gear limit switch 70 is fixedly retained within the operator housing and is driven directly from the operator shaft 50 by suitable gearing arrangement to cause deenergization of the electrical motor 42 upon reaching a predetermined number of operator shaft revolutions. The limit switch 70, therefore, is adapted to cause deenergization of the electric motor 42 as the gate member of the valve reaches a fully open or fully closed condition.

Figure 3:
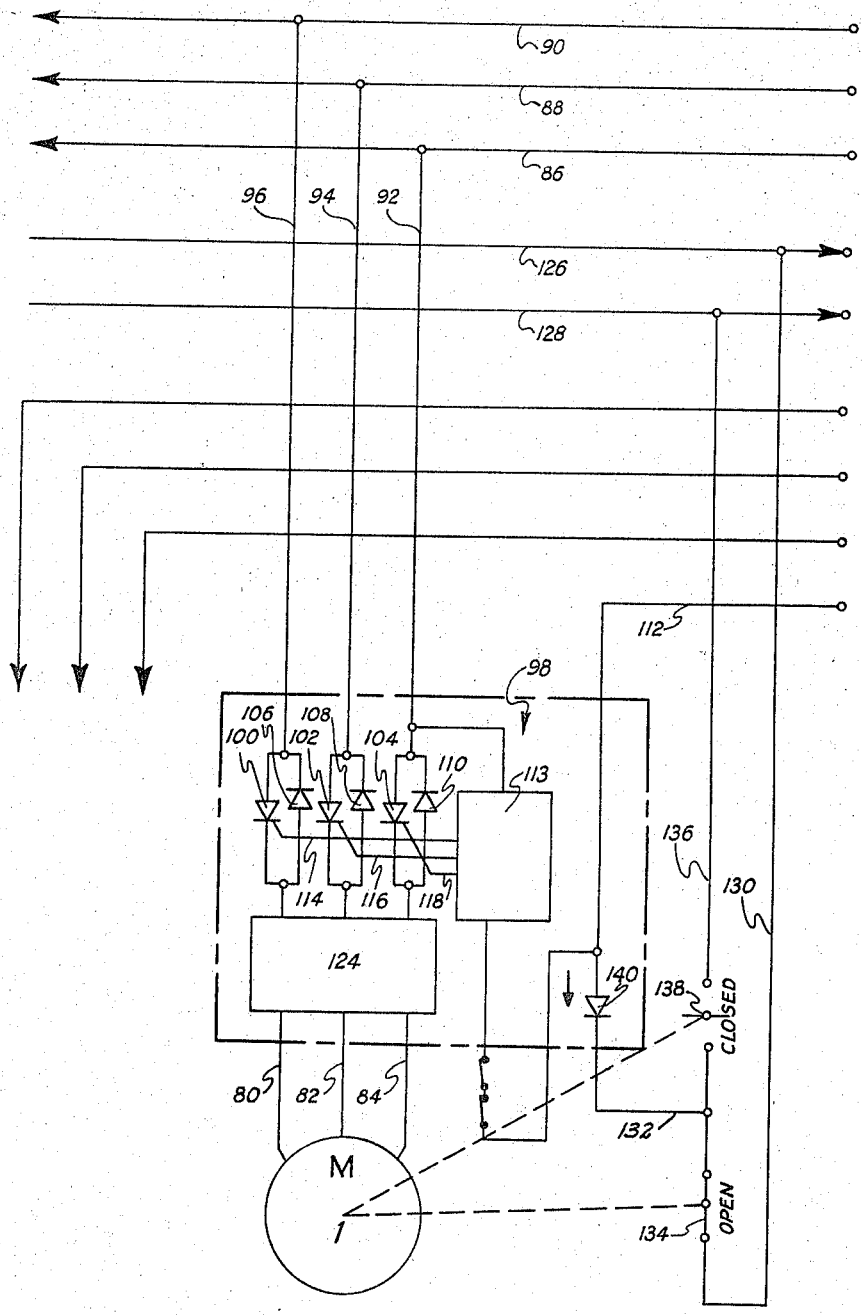
FIGURE 3 is a schematic view of the electrical switching circuitry of a power operator device constructed in accordance with the instant invention.

Referring now to FIGURE 3, embodying an important feature of the invention, a motor M for driving a power operator is schematically illustrated. The motor M is provided with an electrical circuitry which may be three phase circuitry, as illustrated in FIGURE 3, embodying three electrical conductors 80, 82 and 84. A similar number of motor busses 86, 88 and 90 corresponding to the number of conductors in the circuitry of the electrical motor M are provided in the primary electrical cable 30 and the branch cable 32. A motor circuit comprising the conductors 92, 94 and 96 is connected to the motor busses 86, 88 and 90, and supplies electrical energy to the electrical switching circuitry 98, indicated by broken lines in FIGURE 3. For admitting or preventing the flow of electrical current from the motor conductors 92, 94 and 96, each of the motor conductors is provided with a gate circuit comprising a rectifier and a diode arranged in opposite polarity and connected in parallel with the respective conductor. As illustrated in FIGURE 3, three silicon controlled rectifiers 100, 102 and 104 are disposed to allow the flow of half-wave electrical alternating current to the motor conductors 80, 82 and 84 upon energization of the gates of the silicon controlled rectifiers. Three solid state diodes 106, 108 and 110 are disposed in opposite polarity with the silicon controlled rectifiers 100, 102 and 104, respectively, and are arranged to admit one-half wave of electrical alternating current of opposite polarity to that admitted by the silicon controlled rectifiers. An electrical command conductor 112 provides a gate voltage supply 113 for the silicon controlled rectifiers 100, 102 and 104. The gate voltage supply 113 may take the form of a transformer which is energized by the command circuit 112 for providing the gates of the silicon controlled rectifiers with the proper voltage for energization thereof. The gate voltage supply 113 may also take the form of a simple circuit with the gate circuits of each of the silicon controlled rectifiers in parallel therewith. As illustrated in FIGURE 3, the gate voltage supply is connected to the gates of the silicon controlled rectifiers 100, 102, and 104 by conductors 114, 116 and 118 respectively. While the switching circuitry of this application is generally directed to solid state circuitry, it is not intended as limiting in regard to this invention. Any suitable switching circuitry might be employed with satisfactory success. Energization of the command circuit 112 is controlled by a pair of overload switches 120 and 122, which are normally closed, but which may be opened by a torque switch such as that illustrated at 58 in FIGURE 2. The torque switch 120 is caused to open if an overload occurs while the motor M is running in a forward direction. The overload switch 122 is opened if the overload occurs in the reverse direction of motor operation.

An electronic filter 124, which may be any one of a number of satisfactory filter types, is placed within the motor circuit and serves to prevent stray currents in the motor circuitry from reaching the solid state components of the circuitry. For example, a current induced by back EMF from the motor circuit could cause misfiring of the silicon controlled rectifiers which would produce erratic motor control.

The main and branch control cabels 30 and 32 are provided with a pair of signal busses 126 and 128, which serve to transmit signals from the power operator circuitry to indicate whether the power operator is in a "open" or "closed" position or is being moved between open and closed positions. For clarity of explanation, the terms "open" and "closed" refer to positions of the power operator as related to a valve. For example, the "open" position refers to an operator position causing a valve with which it is associated to be opened thereby allowing the flow of fluid through the valve. The "open" signal buss 126 is connected to the command circuit 112 by means of signal conductors 130 and 132. A motor operated limit switch 134 is disposed within the signal conductor 130. A "closed" signal conductor 136 is connected between the signal buss 128 and the signal conductor 132 and includes a limit switch 138 for controlling the flow of current through the conductor 136. The limit switches 134 and 138 are driven by the motor M as illustrated at 70 in FIGURE 2 and as illustrated in dash lines in FIGURE 3. The limit switch 70 therefore is a combined switch incorporating the switches 134 and 138, each switch being responsive to a predetermined number of operator shaft rotations for moving to their closed positions. As illustrated in FIGURE 3, the power operator is at a position fully opening the valve. Only at this position will the switch be closed. Upon movement of the motor M and the drive shaft 50, the "open" switch 134 will be moved to its open condition, thereby preventing the flow of current through the signal circuitry. As the motor M drives the power operator between fully open and fully closed positions of the valve associated with the operator, both of the limit switches 134 and 138 will be in their open condition. Upon reaching the closed condition as determined by the limit switch 70, the switch 138 will be moved to its closed position, thereby allowing the flow of electrical energy through the conductor 136 and through the signal buss 128. The diode 140 effectively prevents any backflow of electrical current from either of the signal circuits 130 and 136 and upon closing of either of the switches or both of the switches 134 and 138, the diode 140 effectively allows the flow of electrical energy from the command circuit 112 through one or both of the signal circuits 130 and 136. The switching unit therefore is completely devoid of mechanical switching apparatus and is controlled from a remote location by current transmitted through the command conductor 112. The silicon controlled rectifiers, in response to energization of the gates thereof and because of their parallel relationship with the diodes 106, 108 and 110 will admit the flow of electrical current from the motor busses to the motor conductors 80, 82 and 84 for operation of the motor M.

The invention is also applicable for use with direct current electrical power. In this case only controlled rectifiers are required for the switching circuitry and these would be placed to normally prevent the flow of current through the circuitry in their deenergized condition. Upon energization of the rectifiers by means of a command circuit, the rectifiers will be conditioned to admit the direct current for operation of the operator motor.

Each of the power operator devices to be controlled will be provided with switching circuitry similar to that illustrated in FIGURE 3. The switching circuitry of each of the power operators, however, may be located in a single switching control housing if desired. It is generally felt, however, that it would be more efficient to provide each of the power operators with individual self-contained switching circuitry rather than centralizing the circuitry of a group of power operators. Either may be done, however, within the spirit or scope of this invention.

Figure 4:
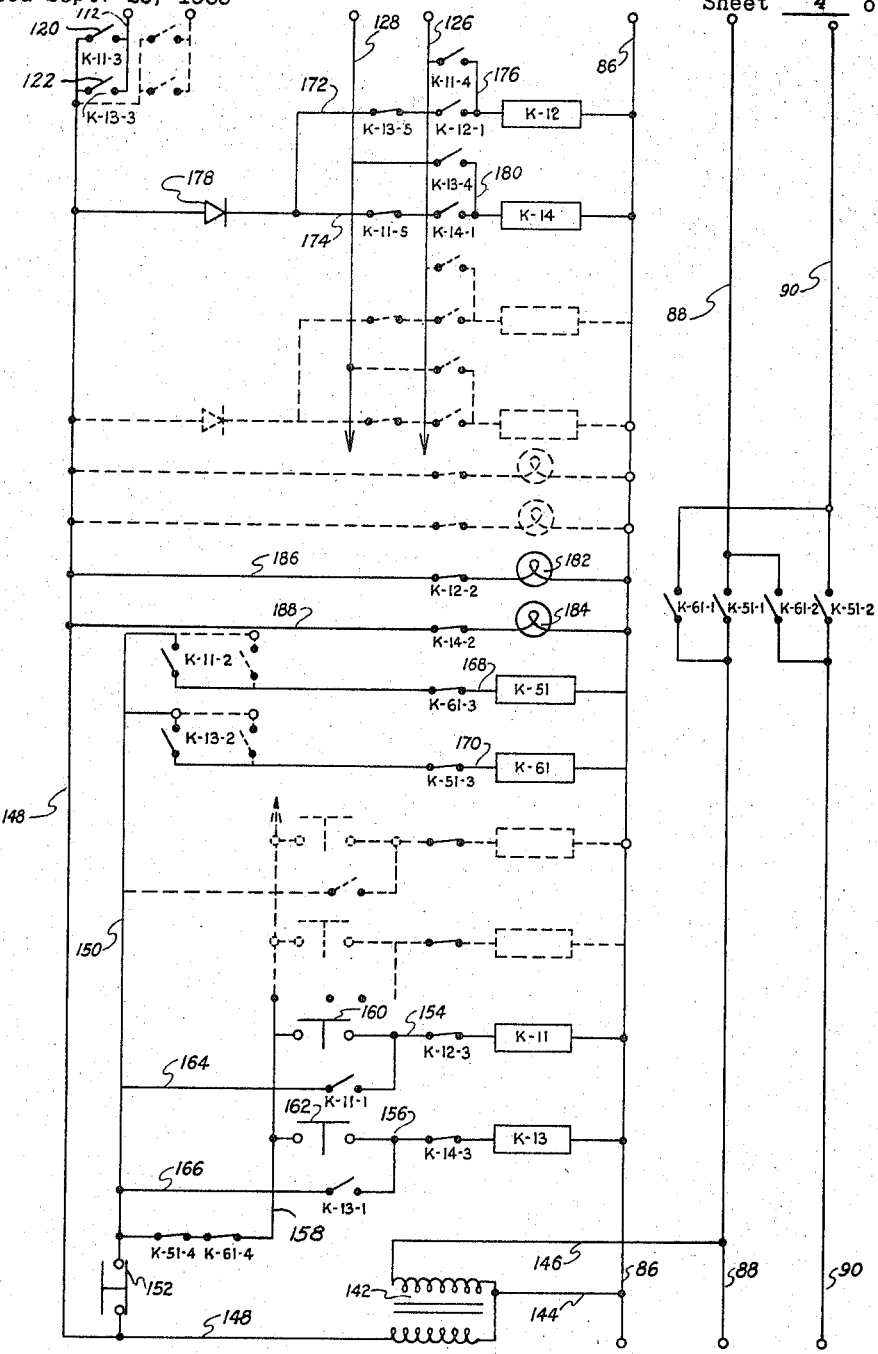
FIGURE 4 is a schematic view of electrical control circuitry for selectively controlling a plurality of power operator devices.

As illustrated in FIGURE 4, the circuitry of the land or above surface based portion of the power operator control system is simplified to afford a ready understanding of the invention. The circuitry illustrated in FIGURE 4 illustrated in full lines includes only that circuitry required for operation of a single power operator device in accordance with the spirit and scope of this invention. The circuitry illustrated by the dash lines in FIGURE 4 is indicative of expansion of the circuitry to control more than a single operator. The circuitry might be expanded to control any desired number of power operator devices. The circuitry illustrated in FIGURE 4 will generally be located within a control console in a control station as illustrated at C in FIGURE 1. With regard to FIGURE 4, the motor busses 86, 88 and 90 are connected to a source of electrical power which may be a 440-volt alternating current input, for example. The motor buss 86 serves as a common or ground conductor for control aspects of the circuitry. A control voltage transformer 142 has its input windings connected across the motor busses 86 and 88 by means of conductors 144 and 146 respectively. An output conductor 148 of the transformer 142 conducts electrical current to the command line 112 as well as to other command lines in the control system. A conductor 150 is connected through a normally closed, manually actuated stop switch 152 to the control conductor 148 and supplies electrical energy for the command initiation circuits of the control system.

A pair of command initiating circuits 154 and 156 are connected to a conductor 158, which is in turn connected to the control power conductor 150. The command initiating circuits 154 and 156 are substantially identical and serve to select the direction of rotation of the electric motor M in addition to conditioning and energizing various other portions of the control circuitry. Each of the command initiating circuits 154 and 156 includes manually actuated push button type switches 160 and 162 respectively, which are manually depressed by personnel at the control station for selectively energizing the motor M of the power operator to cause movement of the valve in a preselected direction. An "open" command relay K–11 and a "closed" command relay K–13 are disposed respectively within the command initiating circuits 154 and 156 and are energized upon closing either of the switches 160 or 162. Each of the relays K–11 and K–13 are provided with a number of contacts which are normally open during the deenergized state of the relays. For purpose of clarity, the contact of each of the relays is identified by prefixing the relay reference numeral and suffixing the particular contact number. For example, as illustrated in FIGURE 4, the solenoid energized relay K–11 includes five contacts which are identified in the circuitry as K–11–1, K–11–2, etc. A pair of conductors 164 and 166 are connected between the conductors 154 and 156 provides a holding circuit for the solenoid energized relay assocated therewith and includes a contact which is normally open, but which is closed upon energization of the associated relay. This contact in effect forms a bypass around the conductor 158 to supply the relay with energizing current after opening of the manual switch. The contact K–11–1 in the conductor 164 is in its open condition when the relay K–11 is deenerized. Upon energization of the solenoid relay K–11, the contact K–11–1 will be closed, thereby allowing the flow of current through the conductor 164 to the command initiation circuit 154. A contact K–13–1 associated with the "closed" command relay K–13 is closed upon energization of the closed command initiation circuitry 156 by closing of the manually actuated switch 162. Upon closing of the contact K–13–1, electrical energy will be supplied through the conductor 166 to the initiation circuitry 156 to, in effect, form a holding circuit continually energizing the closed command relay K–13.

A pair of motor buss control circuits 168 and 170 are disposed for connection in parallel with the power conductor 150 and are energized responsive to conditioning thereof by the "open" or "closed" command initiation circuits 154 and 156 for selection of a predetermined phase sequence in the current powering the electric motor M. A normally open contact K–11–2, which is associated with the "open" command relay K–11 is disposed within the motor buss control circuit 168 and is closed responsive to energization of the relay K–11 for energizing the circuit 168. A solenoid energized relay K–51 incorporated in the motor buss control circuit 168 is energized responsive to closing of the contact K–11–2. The solenoid energized open power relay K–51, upon being energized, closes normally open contacts K–51–1 and K–51–2, which are disposed within the motor buss conductors 88 and 90, respectively. Upon energization of the relay K–51 therefore, a particular phase sequence of alternating current is supplied to the motor M by the motor busses 86, 88 and 90. A contact K–51–3, which is normally closed, is disposed within the motor buss control circuit 170 and is moved to its open condition by energization of the relay K–51, thereby positively preventing energization of the motor buss control circuit 170 while the circuit 168 is energized. A relay energized contact K–51–4 is disposed within the conductor 158 and is moved to its open condition responsive to energization of the relay K–51. With the contact K–51–4 in its open condition, the conductor 158 is completely deenergized and it is impossible to introduce conflicting command currents to the control circuitry by inadvertent closing of the switches 160 or 162. When a single operator circuit is selected, it is not possible to cause simultaneous operation of more than one of the selected power operator devices, nor is it possible to simultaneously energize the relays K–51 and K–61, which would otherwise introduce conflicting signals to the phase sequence selecting circuitry of the control system.

For simultaneous operation of remotely located power operator devices, it is necessary to provide control circuitry which is operative to cause simultaneous energization of more than one command circuit. This is accomplished by providing circuitry for simultaneous energization of selected initiation relays to the exclusion of nonselected relays.

A "closed command" relay K–61 is likewise disposed within the motor buss control circuit 170 and is energized responsive to closing of a contact K–13–2 in the circuit 170 which is closed by energization of the closed command relay K–13 in the command initiating circuit 156. A pair of normally open contacts K–61–2 are associated with the motor busses 88 and 90 in such a manner that closing of the contacts K–61–1 and K–61–2 will cause a reversing of the phase sequence of the alternating current supplied to the electric motor M, thereby causing the electric motor M to operate in a reversed direction. A contact K–61–4, which is disposed within the power conductor 158, is normally closed and is opened responsive to energization of the relay K–61, thereby causing deenergization of the conductor 158 to prevent the possibility of simultaneously energizing more than one of the selected power operators if the switch 160 or any other initiation switch is inadvertently or otherwise closed.

For energization of the command lines 112 for supplying controlling electrical energy to the gate voltage supply 113 of the motor switching circuitry 98 as illustrated in FIGURE 3, a pair of contacts K–11–3 and K–13–3 are energized responsive to energization of the associated relay K–11 and K–13 respectively, thereby electrically connecting the command circuit 112 to the control voltage circuit 148 in response to the "opened" and "closed" command initiation circuits 154 and 156.

With reference to FIGURE 3, the electrical command signal introduced unti the command conductor 112, in addition to energizing the gate voltage supply, will flow through the diode 140, the conductor 132 and through one or both of the conductors 130 and 136 to the signal busses 126 and 128, and through the signal busses 126 and 128 will return to the control circuitry at the control station.

With reference now to FIGURE 4, an "open complete" circuit 172 and a "closed complete" circuit 174 are employed to neutralize the control circuitry upon receipt of a signal that the remote operator has completed the desired cycle of operation. The "open" and "closed" complete circuits are connected in parallel between the reference or ground motor bus 86 and the control voltage conductor 148. The "open complete" circuit 172 is connected to the "open" signal buss 126 by a conductor 176. A normally open contact K–11–4 is disposed within the conductor 176 and is closed responsive to energization of the relay K–11, and thereby conditions the conductor 176 for allowing the introduction of an electrical signal from the "open" signal buss 126 to the "open complete" circuit 172. A solenoid energized relay K–12 is disposed within the circuitry 172 and upon being energized will cause the contact K–12–1, associated therewith, to close thereby allowing the flow of electrical current from the conductor 148 through a current control diode 178 and to the "open complete" circuit 172. The signal from the open signal buss 126 may be of the order of a short duration impulse sufficient only to move the relay K–12 to its energized position or it may be a sustained current flow depending upon the design of the circuitry. The contact K–12–1 therefore serves as a holding contact to maintain the relay K–12 in an energized condition after the relay K–12 has been moved to the energized position by the impulse from the "open" signal buss 126. A contact K–13–5, which is normally closed, is moved to its open condition responsive to energization of the "closed" command relay K–13 with which it is associated. The contact K–13–5 therefore is responsive to energization of the "closed" command relay K–13 to cause deenergization of the "open complete" circuit 172. As the "open complete" circuit 172 deenergizes, the relay K–12 will move to its deenergized position thereby causing opening of the contact K–12–1. The "closed complete" circuit 174 is substantially identical to the "open complete" circuit 172, and includes a holding contact K–14–1, which is moved to its closed position by a closed complete relay K–14 through a conductor 180 under control of a contact K–13–4. The contact K–13–4 is moved to its closed posiltion upon energization of the relay K–13. A circuit breaking relay K–11–5 is moved to its open position responsive to energization of the open command relay K–11 to cause deenergization of the closed complete circuit 174.

For a visual indication of the condition of the remotely located power operator device, a pair of visual indicator devices, which may take the form of a signal light as illustrated in FIGURE 4, or other suitable visual indicator devices, are disposed within a pair of conductors 186 and 188 respectively, which are connected between the motor reference buss 86 and the control voltage conductor 148. A pair of visual indicator contacts K–12–2 and K–14–2 are disposed within the conductors 186 and 188 and are controlled respectively by the "open complete" relay K–12 and the "closed complete" relay K–14, with which they are associated.

The relays K–12 and K–14 are normally biased to a deenergized position when the same are not energized through the "open complete" or "closed complete" circuitry. The contacts K–12–2 and K–14–2 will be in a normally closed condition when the relays K–12 and K–14 are in their respective denergized positions. Therefore, in the deenergized positions of the relays K–12 and K–14, the signal indicator lights 182 and 184 will both be energized. Upon receiving an impulse from the "open" signal buss 126 through the conductor 176, the relay K–12 will be moved to its energized position causing the contact K–12–1 to close, thereby establishing a holding circuit for the relay K–12. When the relay K–12 is energized, the contact K–12–2 is moved to its open position, thereby deenergizing the "closed" indicator light 182 while the open indicator light 184 remains energized through the conductor 188. Because of the holding contact K–12–1, the "open complete" relay K–12 will remain energized thereafter until the "closed" command relay K–13 is energized causing the contact K–13–5 to move to its open position, thereby deenergizing the "open complete" circuitry 172. Operation of the "closed complete" circuitry 174 is substantially identical to the operation of the "opened complete" circuitry 172. Upon energization of the relay K–14 by electrical impulse flowing from the closed signal buss 128 through the conductor 180, the closed complete circuit will become energized thereby causing movement of the relay K–14 to its energized position. Movement of the relay K–14 to its energized position causes closing of the holding contact K–14–1, thereby maintaining the relay K–14 in its energized position. The contact K–14–2 in the conductor 188 will be moved to its open position by the relay K–14 breaking the circuit and causing the position indicator light 184 to become deenergized. The position indicator light 182 will remain energized through its circuit 186, thereby indicating that the power operator device is in a "closed" condition.

Operation of the circuitry is as follows. Assuming that the valve or mechanical device with which the power operator is associated is in its closed position, and it is desired to move the same to an open position, the personnel at the control station would depress the manually actuatable "open" command initiation switch 160. Since the contact K–12–2 in the "open" command circuit 154 is normally in its closed condition, and since the contacts K–51–4 and K–61–4 in the conductor 158 are in a normally closed condition, the circuit 154 will be energized, thereby energizing the relay K–11. Upon energization of the relay K–11, the holding contact K–11–1 will be moved to its closed position allowing energization of the "open" command circuitry 154 through the conductor 164. The switch 160 being biased to its open condition will automatically move to its open condition breaking the circuit through the conductor 158. The relay K–11 also closes the contact K–11–2 in the motor buss control circuit 168, and through the normally closed contact K–61–3, the relay K–51 will be energized, thereby causing contacts K–51–1 and K–51–2 in the motor buss conductors 88 and 90 to be closed to select a desired phase sequence of the alternating current supplied by the motor busses. The contact K–11–3 is moved to its closed condition by the relay K–11 and causes energization of the gate voltage supply 113 by the control voltage from the transformer 142 through the command conductor 112 and the control voltage conductor 148. The contact K–11–4 is closed by the relay K–11 upon energization thereof and conditions the "open complete" circuitry 172 for receiving a signal impulse from the "open" signal buss 126 through the conductor 176. The relay K–11–5 in the closed complete circuitry 174 is opened upon energization of the relay K–11 which causes deenergization of the latching relay K–14. Upon movement of the latching relay K–14 to its deenergized position, the contact K–14–2 will be closed, thereby energizing the "open" indicator light 184. Upon the first movement of the motor M to move the power operator device between "open" and "closed" positions, the closed one of the limit switches 134 and 138 will be opened, thereby deenergizing both of the signal busses 126 and 128. Both the gear operated limit switches 134 and 138 will be open during transition of the power operator between "open" and "closed" positions. At least one of the limit switches 134 and 138 will be in the open position at any phase of operator movement so that signal busses will not be energized at the same time. Upon reaching the open position, the limit switch 134 will be closed, thereby energizing the conductor 130 and signal buss 126 from the command circuit 112. Upon movement of the gear operator structure to the closed position, the limit switch 138 will be closed, thereby allowing the "closed" signal buss 128 to be energized through the conductor 136.

The gate voltage supply 113 will be energized through the command circuit 112 and the control voltage circuit 148, assuming that the overload switches 120 and 122 are in a closed position, and the gates of the silicon controlled rectifiers 100, 102 and 104 will be energized, thereby causing the rectifiers to admit one-half cycle of alternating current to the motor conductors 80, 82 and 84. The diodes 106, 108 and 110 will admit the half cycle of alternating current thereby allowing full cycle alternating current to be supplied to the motor conductors 80, 82 and 84. As indicated above, the motor buss 86 represents a reference or ground conductor and the motor conductors 84 and 92 represent a reference or ground to complete the circuitry of the motor M.

Assuming now that the motor M has driven the power operator to the end of the opening stroke or cycle, the open limit switch 134 will have been moved to its closed position as illustrated in FIGURE 3, thereby energizing the open signal buss 126. Since the contact K–11–4 has been closed by the relay K–11, thereby conditioning the circuit 172 to receive an open signal impulse, the impulse in the open signal buss 126 induced upon closing of the limit switch 134 will, through the contact K–11–4, the conductor 174 and the conductor 176, cause the latching relay K–12 to be moved to an energized position. Upon moving to an energized position, the latching relay K–12 will cause the holding contact K–12–1 to be closed energizing the "open complete" circuit 172 from the control voltage conductor 148 which maintains the latching relay K–12 in its energized position. The latching relay K–12, upon being energized, will cause the contact K–12–2 to be opened, thereby deenergizing the signal indicator 182, and giving a positive indication through the energized signal indicator 184 that the power operator device has positively reached its "open" position. For deenergizing the motor circuitry upon reaching the "open" position, the latching relay K–12 causes the contact K–12–3 in the "open" command initiation circuit 154 to become open thereby deenergizing the relay K–11. Upon being deenergized the relay K–11 causes the contact K–11–3 to be opened, thereby deenergizing the command 112, the gate voltage supply 113 and the gate circuits 114, 116 and 118 of the silicon controlled rectifiers. The silicon controlled rectifiers upon being deenergized will prevent or block the flow of electrical current to the motor conductors 80, 82 and 84. At the same time the relay K–11 is deenergized the contact K–11–2 will become opened deenergizing the motor buss control circuit 168.

For moving the power operator from its open to its closed position, the personnel at the control station will depress the switch 162, thereby energizing the "closed" command relay 113 through the power conductor 150, the conductor 158 and the "closed" command initiation circuitry 156. The relay K–13 upon being energized will close the holding contact K–13–1, thereby establishing a holding circuit to maintain the "closed" command relay K–13 in an energized position. The relay K–13 also closes contact K–13–2 in the motor buss control circuit 170, thereby causing energization of the power relay K–61, which in turn causes closing of the contacts K–61–1 and K–61–2 in the phase selection circuitry to reverse the phase sequence of the alternating current in the motor busses 86, 88 and 90. The relay K–13 also causes closing of the contact K–13–3 to cause energization of the command line 112 from the control voltage conductor 148. The command line 112, upon being energized, in turn energizes the gate voltage supply 113 for supplying gate voltage to the silicon controlled rectifiers for operation of the same as indicated above.

The conditioning contact K–13–4 is closed immediately upon energization of the relay K–13 to condition the "closed complete" circuit 174 causing the same to energize the latching relay K–14 upon receiving a signal pulse from the "closed" signal buss 128. The relay K–13 simultaneously opens the contact K–13–5, thereby breaking the "open complete" circuit 172 and deenergizing the latching relay K–12. At this point during movement of the power operator between "open" and "closed" positions by the motor M, the relay K–12 and K–14 will be deenergized and both the signal indicator contacts K–12–2 and K–14–2 are closed causing both of the signal indicators 182 and 184 to visually indicate that movement of the power operator is in progress. If one of the two lights 182 or 184 is illuminated, the power operator will be in its "open" or "closed" position. If both of the lights are illuminated, the operator will be moving between "open" and "closed" positions. If neither of the lights is illuminated, there is an indication that the control system has become inoperative, for example, by power failure or damage to the control cable.

As the closed limit switch 138 is moved to its closed position upon termination of the power operator movement, a signal from the command line 112 through the diode 140 and the conductor 132 is transmitted to the signal buss 128 by the conductor 136. The closed signal impulse will be received from the signal buss 128 through the conductor 180 to the closed complete circuit 172 and will cause energization of the latching relay K–14 moving the same to an energized position. The contact K–14–1 will be closed by the latching relay K–14, thereby forming a holding circuit for continued energization of the latching relay K–14. Simultaneously with energization of the latching relay K–14, the contact K–14–2 will be opened thereby causing the "open" indicator signal 184 to be deenergized to give a positive indication that the power operator has reached its closed position as indicated by the illuminated "closed" signal indicator light 182.

For deenergization of the motor circuitry as the latching relay K–14 assumes an energized position, the contact K–14–3 in the closed command initiation circuit 156 will move to its open position, thereby deenergizing the relay K–13. The deenergized relay K–13 in turn opens the contact K–13–2 of the circuit 170, thereby deenergizing the relay K–51 and causing the contacts K–51–1 and K–51–2 of the motor buss conductors 88 and 90 to become open, whereupon the motor buss circuit becomes deenergized. At this time the motor buss circuit, the command circuits and the signal busses will be deenergized. The only portion of the control circuitry which will remain energized will be the latching relay K-14 through the "closed complete" circuit 174 and the "closed" indicator signal 184. Until the operator circuitry is initiated to again cause movement of the operator between closed and open positions, the signal indicator 184 will positively indicate the position of the power operator. It is readily determined, therefore, by mere inspection of the signal indicator lights 182 and 184 whether the power operator is in its open or closed positions or is undergoing movement between open and closed positions.

While the discussion in regard to the power operator control circuitry has been generally confined to the operation of a single operator, it is contemplated that a number of remotely located power operator devices might be controlled by control circuitry in accordance with the spirit and scope of this invention. As illustrated in FIGURE 4, circuitry for the control of an additional remotely located power operator device is illustrated in dash line form. It is within the scope of the invention to include any number of desired control circuits for any number of remotely located power operator devices. For example, for controlling the four valves of the wellhead assembly illustrated in FIGURE 1, a control circuitry including four control circuits would be required. This, however, would be considered a mere matter of duplication of the circuitry illustrated in FIGURE 4 and is not shown in the drawings for the sake of simplicity.

It will be evident from the foregoing that I have provided a novel power operator control system which provides switching circuitry at the power operator device being substantially free from mechanical circuit control apparatus. Since the switching control circuitry at the power operator is substantially free from mechanical control apparatus, the reliability of the switching control circuitry is greatly enhanced. It is also evident that I have provided a novel electrically energized submersible power operator construction which provides a feedback of information in the form of visual indication to positively indicate the position of the power operator at all times. It is apparent also that I have provided a novel electrically energized power operator construction which allows simultaneous or selective operation of one or more of selected power operator devices which are controlled from a remote location. The control system of my invention allows the control of a number of remotely located power operator devices from a central point and through a single power and control cable. This advantage allows the invention to be of low cost, extremely simple and therefore reliable in use. Therefore, it is seen that the invention is one well adapted to obtain all of the objects hereinabove set forth together with other advantages which become obvious and inherent from the description of the apparatus itself.

It will be understood that certain combinations and subcombinations are of utility and may be employed without reference to other features and subcombinations.

This is contemplated by and is within the scope of the claims. As many possible embodiments may be made of the invention without departing from the spirit or the scope thereof, it is to be understood that all matters hereinabove set forth are shown in the accompanying drawings are to be interpreted as illustrative and not in a limiting sense.

What we claim is:

1. A control system comprising one or more electrically energized remotely located valve devices, each of said devices having an electric motor therefor, each of said motors including electrical motor operation and control circuitry therefor, a source of electrical power for said motors, a power circuit connected to said power source and extending to each of the valve devices, a motor switching circuit for each of said devices being connected to said power circuit, and to the respective one of said motors, said switching circuit including means for selectively admitting the flow of electrical current from said power circuit to said motor for operation of said motor, electrical control circuitry located remotely with respect to said valve devices and including means for controlling and reversing the direction of operator motor rotation, said control circuitry including a plurality of command circuits provided one for each of said valve devices and extending from said control circuitry to the respective one of said power operators and being connected to said remotely energized means, each of said command circuits being provided with means responsive to selective energization of a predetermined portion of said control circuitry for connecting a selected one of the command circuits to said command power circuit to the exclusion of the other command circuits, whereby the switching circuit of the selected one of said valve devices will be energized causing the same to admit electrical current from said power circuit to operate said motor.

2. A power operator system for one or more submerged valves comprising at least one electrically energized power operator device for operation of said valves, said power operators each having an electric motor including a plurality of leads and a control circuit for said motor, a source of alternating current including a power circuit connected to the motor circuitry of each of the power operator motors, a switching circuit including opposed polarity silicon controlled rectifiers and diodes for each lead of said motor circuitry, said silicon controlled rectifiers having gate circuits adapted upon being controllably energized to permit the flow of alternating current through said silicon controlled rectifiers having gate circuits adapted upon being controllably energized to permit the flow of alternating current through said silicon controlled rectifiers to said motor circuitry for energization of said motor, a command circuit having a gate voltage supply source electrically connected to said gate circuits of the switching circuit of each of the power operator motors, means responsive to selection of a particular one of said power operators for energizing the corresponding command circuit thereby causing energization of the switching circuit by said gate voltage supply and causing the switching circuit to admit the flow of electrical current from the power circuit to the motor circuit for operation of the selected motor, reversing means responsive to said selection for conditioning said power circuit thereby causing the same to transmit alternating current of a predetermined phase sequence to said motor circuit for selective direction of motor operation.

3. A power operator system for one or more submerged valves comprising at least one electrically energized power valve operator having an electric motor including a plurality of leads and a control circuit for said motor, a source of alternating current including a power circuit connected to the motor circuitry of each of the power valve operator motors, a switching circuit including opposed polarity silicon controlled rectifiers and diodes for each lead of said motor circuitry, said silicon controlled rectifiers having gate circuits adapated upon being controllably energized to permit the flow of alternating current through said silicon controlled rectifiers to said motor circuitry for energization of said motor, a command circuit having a gate voltage supply source electrically connected to said gate circuits of the switching circuit of each of the power operator motors, means responsive to manual selection of a particular one of said power operators for conditioning the corresponding command circuit thereby causing energization of the switching circuit to admit the flow of electrical current from the power circuit to the motor circuit for operation of the selected motor, reversing means responsive to said manual selection for conditioning said power circuit thereby causing the same to transmit alternating current of a predetermined phase sequence to said motor circuit for selective direction of motor operation, electrically energized visual indicator means responsive to said manual selection and energized by said command circuit for positively indicating the condition of the power operator during the entire operating cycle thereof.

4. A system for controlling a plurality of valves from a remote point comprising a motor connected to each valve, an electric power switching unit connected to each motor, power supply conductors connected to all of said switching units and being responsive to energization of said switching units for supplying power therethrough to said motors, a command line for each switching unit extending from the remote point to the switching unit, command signal generating means at said remote point individually connected to each command line, control means responsive to said command signal generating means for causing energization of said switching means to allow the flow of current from said power supply conductors to a selected one of said motors for operation of the same, a plurality of indicating means for indicating at said remote point the positions of said valves, said indicating means including a pair of indicators for each valve, said indicators being located at said remote point, relay means for selectively controlling the energization of said indicators a pair of indicating signal busses extending from said relay means to the locations of said valves, and a plurality of switches connected to each motor and actuated thereby to connect the command line for each switching unit selectively to one or the other of said indicating signal busses.

5. A system according to claim 4 said switching units including silicon controlled rectifiers including gate circuits, said control means being a gate voltage supply connected to the gate circuits, a diode connected in opposite polarity and in parallel relation with each of said silicon controlled rectifiers, means connected between said motor and said silicon controlled rectifiers for isolating voltages generated by said motor during deceleration thereof from said silicon controlled rectifiers.

6. An electrically energized power operator comprising an operator body defining a gear housing and a control housing, gear means within the gear housing adapted upon being driven to impart movement to a control stem, an electric motor having electrical circuitry for controlling the operation thereof and adapted upon energization thereof to impart driving movement to said gear means, a source of electrical power, a power circuit interconnecting said source of electrical power and said motor circuitry for energizing said motor, electrical switching circuitry disposed within the control housing and being connected to the motor circuitry, said switching circuitry including opposed polarity silicon controlled rectifiers and diodes connected in parallel, said silicon controlled rectifiers having a gate circuit being responsive to externally supplied electrical signals for selectively admitting or preventing the flow of electrical current through said switching circuitry for causing selective energization of said motor.

7. A valve control system comprising one or more submerged valves, each of said valves having remotely controllable electric motor actuated power operator means for inducing controlling movement to the associated a selected one of said valves, said power operator means comprising an operator body defining a gear housing and a control housing, gear means within said housing and adapted to impart movement to a control stem of the valve associated therewith, said electric motor adapted upon energization thereof to impart movement to said gear means, an electrical operating circuit for each of said power means, electrical circuitry for controlling at least one of said power means, a source of electrical power connected to said control circuitry and adapted for energizing said operating circuit and said control circuit, electrical circuitry physically interconnecting the operating circuitry of each of said power means with the circuitry of said source of electrical power and being normally electrically disconnected therefrom to prevent undesired operation of said power operator means, means responsive to energization of said control circuitry for selectively electrically connecting said operating circuitry and said control circuitry and allowing selective energization of said power means by said power source.

References Cited

UNITED STATES PATENTS

| | | | |
|---|---|---|---|
| 2,883,975 | 4/1959 | Eck | 318—103 |
| 3,309,593 | 3/1967 | Egglestone et al. | 318—227 X |
| 3,332,008 | 7/1967 | Mueller et al. | 318—227 X |

BENJAMIN DOBECK, *Primary Examiner.*

B. A. COOPER, *Assistant Examiner.*

U.S. Cl. X.R.

137—554, 635; 251—69; 318—490